Patented Feb. 23, 1926.

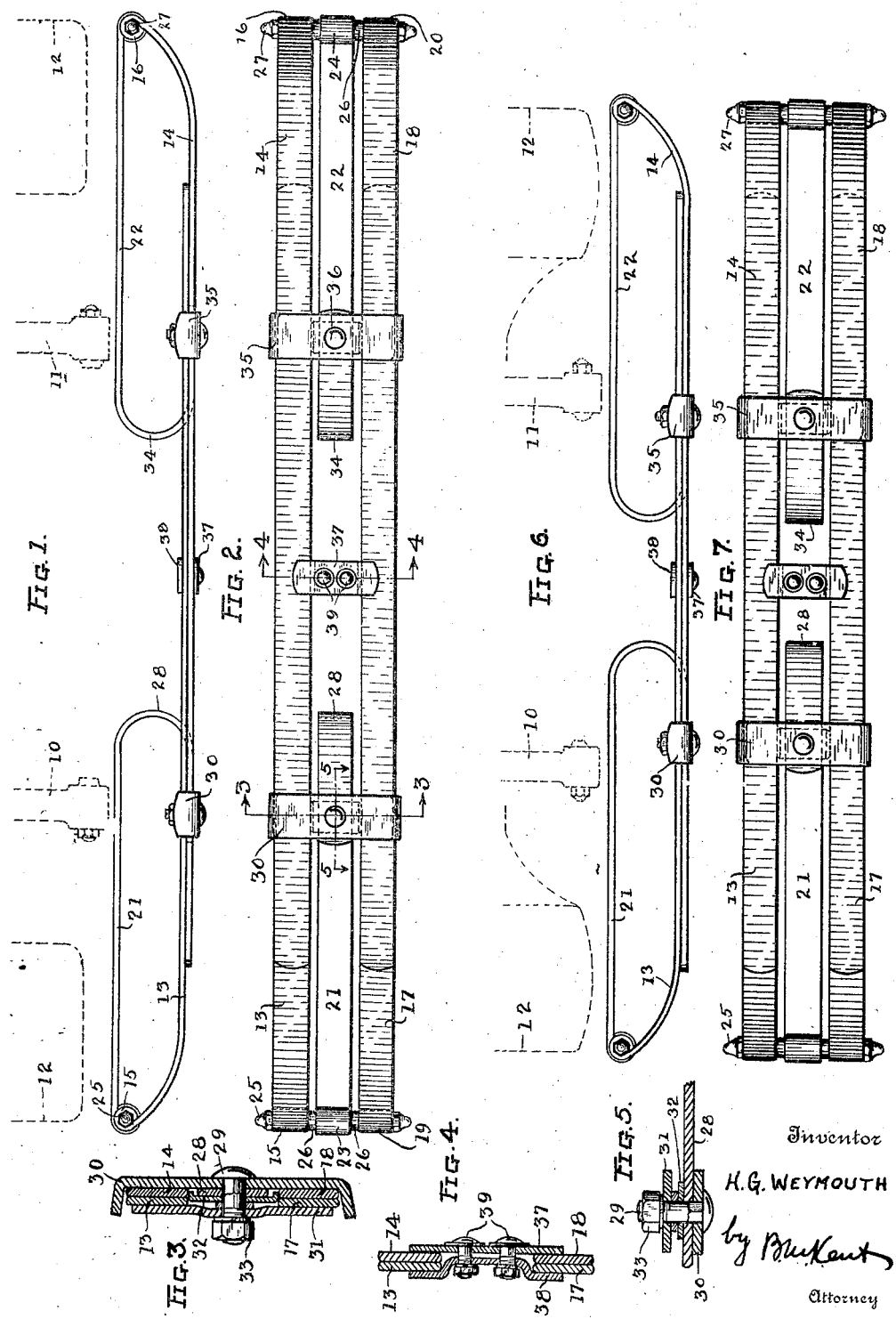

1,574,325

UNITED STATES PATENT OFFICE.

HARRY G. WEYMOUTH, OF CLEVELAND, OHIO, ASSIGNOR TO THE EATON AXLE AND SPRING COMPANY, OF CLEVELAND, OHIO, A CORPORATION OF OHIO.

BUMPER.

Application filed May 29, 1925. Serial No. 33,659.

*To all whom it may concern:*

Be it known that I, HARRY G. WEYMOUTH, a citizen of the United States, and a resident of Cleveland, county of Cuyahoga, State of Ohio, have invented certain new and useful Improvements in Bumpers, of which the following is a specification.

This invention relates to bumpers for motor vehicles and has for one of its objects the provision of a bumper that is especially adapted for heavy vehicles, such as busses, which may be economically manufactured and which will be readily adjustable in length to suit vehicles of different widths.

Other objects of the invention and the features of novelty will be apparent from the following description taken in connection with the accompanying drawings, of which:

Figure 1 is a plan view of a bumper embodying my invention;

Fig. 2 is a front elevation thereof;

Fig. 3 is a section on the line 3—3 of Fig. 2;

Fig. 4 is a section on the line 4—4 of Fig. 2;

Fig. 5 is a section on the line 5—5 of Fig. 2;

Fig. 6 is a view similar to Fig. 1 but showing the bumper adjusted to suit a vehicle that is narrower than that shown in Fig. 1; and Fig. 7 is a front elevation of the bumper, as it appears in Fig. 6.

Referring to the drawings 10 and 11 indicate the usual side members of the vehicle frame and may represent either the forward or rearward ends of these members. The usual fenders are indicated at 12.

According to my invention the bumper comprises a plurality of impact bars and in the drawings I have shown two such bars although it is to be understood that more than two may be employed. These impact bars are arranged in vertically spaced relation, the upper bar comprising the duplicate members 13 and 14 having their inner end portions in overlapped relation and each of these members having an eye at its outer end, these eyes being indicated at 15 and 16, respectively. The lower impact bar comprises the members 17 and 18, which are preferably duplicates of the members 13 and 14 and which have the eyes 19 and 20, respectively, at their outer ends.

Rear or supporting bars are indicated at 21 and 22 and each of these bars has an eye at its outer end indicated, respectively, at 23 and 24 and being arranged between eyes at the ends of the impact bars. As will be seen from the drawings, the eyes 15, 19 and 23 are in alignment and connected together by a bolt 25, spacers 26 being arranged between the eyes, when the distance between the impact bars is greater than the width of the bars 21 and 22. In like manner the eyes 16, 20 and 24 are in alignment and connected together by a bolt 27. The bars 21 and 22 extend adjacent to the ends of the frame members 10 and 11 and are secured thereto by any suitable form of brackets (not shown), these brackets not forming any part of the present invention but being well-known in the art. The inner end of the bar 21 is bent forwardly and outwardly as indicated at 28, which is a return bend, which positions the extreme end portion of the bar 21 between the impact bars. A bolt 29 extends through the end 28 and carries the clamping members 30 and 31, also a spacer 32 which definitely spaces the central portion of the impact bars. A nut 33, on the bolt 29, draws the members 30 and 31 together and, as will be seen from Fig. 3, clamps the members 13 and 14, and the members 17 and 18, together in any relation to which these members may be adjusted. The inner end of the bar 22 has a return bend 34 which carries clamping members similar to those shown in Fig. 3, one of these being indicated at 35 and the clamping bolt being indicated at 36. A spacer similar to the spacer 32 is also provided.

I also further clamp and space the impact bars, at the middle of the bumper, by means of the plates 37 and 38 and the bolts 39, as shown in Fig. 4.

The adjustment of the parts of the bumper for a comparatively wide vehicle is shown in Figs. 1 and 2 and to change the length of the bumper to suit a narrower vehicle, as indicated in Figs. 6 and 7, it is only necessary to loosen the bolts 29, 36 and 39, slide the overlapped portions of the impact rails together and then tighten these bolts to secure the parts in the position to which they are adjusted.

The bumper construction which I have devised is very economical to manufacture because the members 13, 14, 17 and 18 are all alike and the members 21 and 22 are also alike. The construction has the advantage of being adapted for vehicles of different widths and the overlapped inner ends of the impact members provide a very substantial impact section directly in front of the vehicle frame.

Having thus described my invention, what I claim is:

1. In bumpers for vehicles, the combination of a plurality of vertically spaced impact bars connected together at their ends, each of said bars comprising a plurality of relatively adjustable overlapped members whereby the length of said bars may be adjusted to suit the width of the vehicle, a plurality of bars arranged in the rear of said impact bars with their outer ends connected with the ends of the impact bars and with their inner ends bent forwardly for independent connection with the impact bars, and clamping means for securing said inner ends to said impact bars and for securing said members of the impact bars in any relation to which they are adjusted.

2. In bumpers for vehicles, the combination of a plurality of vertically spaced impact bars connected together at their ends, each of said bars comprising a plurality of relatively adjustable overlapped members whereby the length of said bars may be adjusted to suit the width of the vehicle, a plurality of bars arranged in the rear of said impact bars with their outer ends connected with the ends of the impact bars and with their inner ends bent forwardly and then outwardly for independent connection with the impact bars, and devices carried by said inner ends of the rear bars and engaging the overlapped portions of said members and clamping them together in any relation to which they are adjusted.

3. In bumpers for vehicles, the combination of a plurality of vertically spaced impact bars provided with eyes at their ends, each of said bars comprising a pair of relatively adjustable overlapped members whereby the length of said bars may be adjusted to suit the width of the vehicle, a plurality of bars arranged in the rear of said impact bars and having eyes at their outer ends between the eyes on the impact bars and in alignment therewith, bolts for connecting said aligned eyes together, the inner ends of the second-mentioned bars being bent into a position between said impact bars, and devices secured to said inner ends and extending upwardly and downwardly therefrom into engagement with the impact bars to hold the central portions of the latter in definite spaced relation and to clamp said members together in any relation to which they are adjusted.

In testimony whereof I affix my signature.

HARRY G. WEYMOUTH.